June 23, 1953　　E. E. FALKENTHAL　　2,643,277

PHOTOVOLTAIC CELL

Filed April 11, 1950

Inventor
Erwin E. Falkenthal

Patented June 23, 1953

2,643,277

UNITED STATES PATENT OFFICE 2,643,277

PHOTOVOLTAIC CELL

Erwin E. Falkenthal, Berlin-Dahlem, Germany

Application April 11, 1950, Serial No. 155,138
In Germany September 16, 1949

5 Claims. (Cl. 136—89)

1

The invention relates to photovoltaic cells of the barrier-layer type. Photovoltaic cells of this type basically consist of the following parts: a plane carrying body of conducting material, superimposed on it a thin electrons furnishing layer or half-conducting material e. g. of tellurium or selenium, and superimposed on it a collecting electrode penetrable by radiations and consisting e. g. of platinum or gold.

On such cells it has been observed that they are relatively insensitive in respect to radiations of short wave lengths, e. g. blue, violet or ultraviolet, and even more so in respect to still shorter ones, as e. g. Roentgen-, canal-, or gamma radiations. Painstaking experiments have shown that the current-collecting metal layer noticeably absorbs these radiations of short wave lengths thus reducing the photo-electric efficiency in this part of the spectrum.

It is an object of this invention to eliminate the disadvantage mentioned above by superimposing in place of the formerly used current-collecting metal layer a layer consisting of a chemical combination of a metal with oxygen, sulphur, selenium, or tellurium. Especially effective are metal oxides, which are produced in rarefied air or gas by a method described below, in the first place e. g. a cadmium-oxygen compound of such combination and such content of oxygen that certain surface colors result.

Systematic experiments have shown that only specific modifications of a special cadmium compound, especially of cadmium oxide, produce markedly superior effects. So, with cadmium oxide, the violet, blue, or red, but principally the blue-green modifications produce decidedly better effects, while the modifications appearing grey or yellow are unsuited. Obviously it is for their better penetrability that the above named modifications give rise to stronger spontaneous currents.

Figure 3:
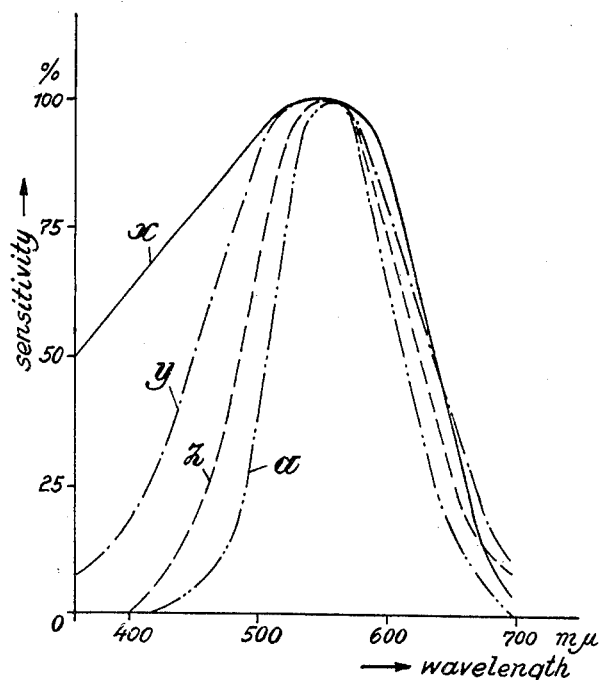

Layers between green and blue produce higher sensitives. Layers between green and red give better approximations to the response of the Standard Observer, which among other curves is represented in Figure 3.

For producing the compounds, which are most favorable for the current-collecting purpose under consideration, there are various production methods fitted for the purpose, which are mainly aiming at dosing in some way e. g. the amount of oxygen required for the formation of the oxide in the current-collecting layer. Experiments in this direction showed that too small amounts of oxygen do not sufficiently reduce the absorption

2 of short wave length radiation, whereas on the other hand too high amounts of oxygen reduce the conductivity of the covering layer too strongly. Experiments on a cadmium oxide showed optimum cell quality, when the following rules were observed: After the application of the electrons furnishing layer, which preferably is a selenium layer, the current-collecting layer, in this case being a cadmium oxide layer, is applied e. g. by slowly sputtering or condensing cadmium on it by means of cathode sputtering or vaporizing in the presence of oxygen under sub-atmospheric pressure, this pressure preferably amounting to 0.01 to 0.1 millimeter mercury. It is adjusted by controlling the exhausting speed e. g. by means of a needle valve permitting atmospheric air to enter, while the color of the cells is observed. Under such conditions, the oxide layer gradually grows as a colored layer, which, with cathode sputtering reaches optimal properties after a treatment of between 5 and 15 minutes with a power consumption of 0.5 to 1.5 watts per square centimeter.

The deposition may be carried out in a few steps, i. e. by applying a number of layers on top of each other, without thereby changing the spirit of this invention. Thus improvements e. g. with respect to the photovoltaic output, may possibly be achieved by charging the individual layers with gases etc. Further experiments reveal, that the sensitivity of the cells can be improved by the addition of alkali metals in very small amounts in the order of 0.001 to 0.1 per cent.

With the application of the described production process the photovoltaic cell according to this invention besides its higher current output furnishes the further advantage of having a spectral curve approximating the eye curve so nearly, that for most applications the use of special filters can be dispensed with. The result of these improvements is a higher current output for measuring under the employment of less sensitive instruments and an especially advantageous applicability for photographic purposes.

The employment of cadmium oxide in photovoltaic cells was previously known, but it was not used then as a current-collecting layer, but only as the electrons furnishing layer combined e. g. with selenium dioxide, employing a pure metal like platinum as a current-collecting electrode.

Figure 1:
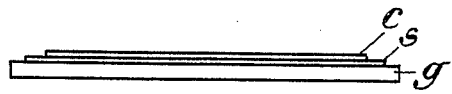
Figure 2:
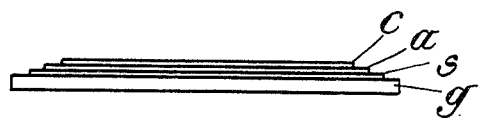

In the accompanying drawing the Fig. 1 and Fig. 2 show embodiments of this invention, Fig. 3 shows a diagram of its function. Fig. 1 shows the arrangement of the different layers forming the photovoltaic cell: On a conductive carrier $g$ made of graphite a thin light-sensitive layer $s$ has been applied which consists of selenium or of selenium coated with a thin protecting layer of graphite. The current-collecting light-transparent thin layer arranged on said layer $s$ is represented by $c$ and consists of a metal-compound, f. i. of cadmium-oxide, cadmium-sulfide, cadmium-selenide or cadmium-telluside; in its preferred form it consists of the violet, blue-green or the red modification of cadmium-oxide.

Fig. 2 shows the special arrangement of the protecting layer $a$ between the light-sensitive layer $s$ and the current-collecting layer $c$.

In Figure 3 curves have been given showing the relative sensitivity as a function of the wavelength. Curve $a$ represents the eye-curve or the visibility curve. Curve $x$ is the curve for the known cells (grey or yellow modification). $y$ designates the green-blue modification, while $z$ shows the curve of the red-green cell. It will easily be seen from these curves that the photovoltaic cells manufactured in accordance with this invention characterised by curves $y$ and $z$ (f. i. green-blue and red-green modification) approximates the eye curve best.

What I claim is:

1. A photovoltaic cell of the layer-type comprising a conducting carrier, a light sensitive semi-conductive layer, a transparent current-collecting thin layer consisting of cadmium-oxide and a protecting layer consisting of thin graphite arranged between said light-sensitive and said current-collecting layer.

2. A photovoltaic cell of the layer-type comprising a conducting carrier, a light-sensitive semi-conductive layer consisting of selenium, a transparent current-collecting thin layer consisting of cadmium-oxide and a protecting layer consisting of thin graphite arranged between said light-sensitive and said current-collecting layer.

3. A photovoltaic cell of the layer-type comprising a conducting carrier consisting of graphite, a light sensitive semi-conductive layer consisting of selenium, a transparent current-collecting thin layer consisting of cadmium-oxide and a protecting layer consisting of thin graphite arranged between said light-sensitive and said current-collecting layer.

4. A photovoltaic cell of the layer-type comprising a conducting carrier, a light sensitive semi-conductive layer consisting of selenium and a transparent current-collecting thin layer on said light-sensitive layer, said current-collecting layer consisting of cadmium-oxide.

5. A photovoltaic cell of the layer-type comprising a conducting carrier, a light sensitive semi-conductive layer and transparent current-collecting thin layer on said light-sensitive layer, said current-collecting layer consisting of an oxide, sulphide, selenide or telluride of cadmium.

ERWIN E. FALKENTHAL.

References Cited in the file of this patent

UNITED STATES PATENTS

| Number | Name | Date |
|---|---|---|
| 2,034,334 | Falkenthal | Mar. 17, 1936 |
| 2,406,139 | Fink | Aug. 20, 1946 |
| 2,414,233 | Lidow | Jan. 14, 1947 |
| 2,479,301 | Blackburn | Aug. 16, 1949 |

FOREIGN PATENTS

| Number | Country | Date |
|---|---|---|
| 106,912 | Australia | Mar. 23, 1939 |

OTHER REFERENCES

Hughes, et al., "Photoelectrical Phenomena" 1932, pages 372–373.